US007795193B2

(12) United States Patent
Takei et al.

(10) Patent No.: US 7,795,193 B2
(45) Date of Patent: Sep. 14, 2010

(54) BASE FOR ELECTRIC INSULATING OIL

(75) Inventors: Mitsuhiko Takei, Tokyo (JP); Takaaki Kanoh, Tokyo (JP); Hidenobu Koide, Tokyo (JP); Kiyoshi Fujii, Tokyo (JP)

(73) Assignees: Lion Corporation, Tokyo (JP); Japan AE Power Systems Corporation, Tokyo (JP)

( * ) Notice: Subject to any disclaimer, the term of this patent is extended or adjusted under 35 U.S.C. 154(b) by 389 days.

(21) Appl. No.: 10/569,605

(22) PCT Filed: Aug. 16, 2004

(86) PCT No.: PCT/JP2004/012032

§ 371 (c)(1), (2), (4) Date: Nov. 21, 2006

(87) PCT Pub. No.: WO2005/022558

PCT Pub. Date: Mar. 10, 2005

(65) Prior Publication Data

US 2007/0069188 A1 Mar. 29, 2007

(30) Foreign Application Priority Data

Aug. 27, 2003 (JP) ............................ 2003-302690

(51) Int. Cl.
*C10M 105/38* (2006.01)
*C09K 5/00* (2006.01)
*C09K 8/32* (2006.01)
*C08G 18/00* (2006.01)

(52) U.S. Cl. ...................... 508/485; 507/138; 528/74.5; 252/67; 252/68

(58) Field of Classification Search .................. 252/67, 252/68; 528/74.5; 507/138; 508/485
See application file for complete search history.

(56) References Cited

U.S. PATENT DOCUMENTS 5,219,733 A * 6/1993 Myojo et al. .................. 435/52
5,645,763 A * 7/1997 Klein et al. ................. 252/364
6,037,537 A 3/2000 McShane et al.
6,184,459 B1 * 2/2001 McShane et al. ........ 174/17 LF
6,352,655 B1 3/2002 McShane et al.
6,398,986 B1 * 6/2002 McShane et al. ............ 252/579
6,667,285 B1 * 12/2003 Kawahara et al. ........... 508/485
2001/0046507 A1 * 11/2001 Dietz et al. ................ 424/401
2002/0109128 A1 8/2002 McShane et al.
2003/0166478 A1 * 9/2003 Shimomura et al. ......... 508/304
2004/0037859 A1 * 2/2004 Cecchi et al. ............... 424/401

FOREIGN PATENT DOCUMENTS

| | | | |
|---|---|---|---|
| EP | 1 225 213 | A1 | 7/2002 |
| JP | 49-25500 | A | 3/1974 |
| JP | 9-259638 | A | 10/1997 |
| JP | 11-306864 | A | 11/1999 |
| JP | 2000-502493 | A | 2/2000 |
| JP | 2000-90740 | A | 3/2000 |
| JP | 2004-149705 | A | 5/2004 |
| WO | WO-97/22977 | A1 | 6/1997 |
| WO | WO-00/68345 | A1 | 11/2000 |
| WO | WO-2004/108871 | A2 | 12/2004 |

* cited by examiner

*Primary Examiner*—Ling-Siu Choi
*Assistant Examiner*—Monique Peets
(74) *Attorney, Agent, or Firm*—Birch, Stewart, Kolasch & Birch, LLP

(57) ABSTRACT

A base for electric insulating oil comprising an esterification product from a $C_8$-$C_{20}$ higher fatty acid and a $C_6$-$C_{14}$ branched aliphatic monohydric alcohol; or a base for electric insulating oil comprising an esterification product from a mixed fatty acid derived from palm oil and/or mixed fatty acid derived from soybean oil and a $C_1$-$C_5$ aliphatic monohydric alcohol or $C_6$-$C_{14}$ branched aliphatic monohydric alcohol. The thus provided base for electric insulating oil excels in viscosity, fluidity, chemical stability, etc. and is capable of satisfactorily exhibiting electrical characteristics of electric insulating oil.

19 Claims, No Drawings

BASE FOR ELECTRIC INSULATING OIL

TECHNICAL FIELD

The present invention relates to a base material for electric insulating oil and, more particularly, to a base material for electric insulating oil which is derived from fatty acids safe from problems with energy and environment.

BACKGROUND ART

Such vegetable oils as soybean oil, rapeseed oil, and castor oil are among conventional electric insulating oils applied to transformers, cables, circuit breakers, and capacitors for their insulation and cooling.

They have recently been replaced by mineral insulating oils or synthetic insulating oils. The former is produced from heavy crude oil by vacuum fractional distillation and subsequent purification (such as washing with sulfuric acid, alkali, and water, and clay treatment). The latter is prepared from diphenyl, silicone, phthalate ester, and the like.

Mineral insulating oils, however, are likely to be restricted in their use because of their high flammability (which endangers safety) and their possibility of posing problems with energy and environment.

On the other hand, synthetic insulating oils have the disadvantage of being highly flammable and expensive. Moreover, phthalate esters are said to cause endocrine disruption.

PCB, which was used as electric insulating oil for a certain period in the past, has been banned because of its problems with safety, toxicity, and environmental pollution.

The foregoing has turned public attention to switching conventional electric insulating oils to safe natural vegetable oils such as soybean oil, rapeseed oil, and castor oil. However, vegetable oils are not suitable for large transformers (which are cooled by convection of insulating oil) on account of their high viscosity and high pour point. Therefore, it has been common practice to use vegetable oils (as electric insulating oil) in combination with mineral or synthetic electric insulating oils.

Mixing vegetable insulating oil with mineral or synthetic insulating oil does not solve problems inherent in the latter.

There has recently been proposed an electric insulting oil derived from a lower alcohol ester of vegetable oil such as rapeseed oil, corn oil, safflower oil, and the like. (See Japanese Patent Laid-open Nos. Hei 9-259638, Hei 11-306864, and 2000-90740.)

These insulating oils, however, are not suitable to practical use because of their incompletely reduced viscosity and pour point and their poor stability to oxygen and heat, and they need improvement.

Rapeseed oil, corn oil, and safflower oil listed as vegetable oils in the above-mentioned documents are not necessarily regarded as renewable resources from the standpoint of the amounts and districts of worldwide production. It is desirable to select insulating oils from a broader range of vegetable oils.

DISCLOSURE OF THE INVENTION

The present invention was completed in view of the foregoing. It is an object of the present invention to provide a fatty acid-derived base material for electric insulating oil, the base material having low viscosity, high fluidity, and good chemical resistance, and the electric insulating oil exhibiting characteristic properties for satisfactory performance.

In order to achieve the above-mentioned object, the present inventors carried out extensive studies, which led to the finding that the base material for electric insulating oil is obtained in the form of ester of a $C_{8-20}$ higher fatty acid with a $C_{6-14}$ branched aliphatic monohydric alcohol or in the form of ester of palm oil-derived mixed fatty acids and/or soybean oil-derived mixed fatty acids with a $C_{1-5}$ aliphatic monohydric alcohol or a $C_{6-14}$ branched aliphatic monohydric alcohol. The base material in the form of ester has low viscosity, high fluidity, and good chemical resistance, and gives electric insulating oil with good characteristic properties for satisfactory performance. In addition, it is a good substitute for conventional mineral or synthetic electric insulating oil and it can be used safely without problems with energy and environment. The present invention is based on this finding.

The gist of the present invention resides in:

1. A base material for electric insulating oil which includes an ester of a $C_{8-20}$ higher fatty acid with a $C_{6-14}$ branched aliphatic monohydric alcohol.
2. A base material for electric insulating oil which includes an ester of palm oil-derived mixed fatty acids and/or soybean oil-derived mixed fatty acids with a $C_{1-15}$ aliphatic monohydric alcohol or a $C_{6-14}$ branched aliphatic monohydric alcohol.
3. A base material for electric insulating oil as defined in 1 or 2, which further includes a pour point depressant.

BEST MODE FOR CARRYING OUT THE INVENTION

The first aspect of the present invention relates to a base material for electric insulating oil which includes an ester of a $C_{8-20}$ higher fatty acid with a $C_{6-14}$ branched aliphatic monohydric alcohol.

Here, the term "base material for electric insulating oil" denotes any material that will be used as the major component of electric insulating oil to insulate or cool transformers, cables, circuit breakers, and capacitors.

Electric insulating oil needs such characteristic properties as high dielectric breakdown voltage, high volume resistivity, small dielectric loss tangent, adequate permittivity, low viscosity and good cooling performance, good heat resistance, good chemical resistance to oxygen, noncorrosiveness on metals, small coefficient of thermal expansion, low volatility, low pour point (to remain fluid over a broad range of temperature), and absence of impurities. Additional requirements include high flash point (for safety in case of leakage), good biodegradability, and minimum adverse effect on living organisms and environments.

The base material for electric insulating oil which is defined in the first aspect of the present invention is derived from a $C_{8-20}$ higher fatty acid, which includes, for example, caprylic acid, capric acid, lauric acid, myristic acid, palmic acid, palmitoleic acid, stearic acid, oleic acid, linoleic acid, linolenic acid, elaidic acid, arachic acid, and arachidonic acid. They may be used alone or in combination with one another.

Any higher fatty acid with a carbon number less than 8 will give esters poor in electric characteristics. On the other hand, any higher fatty acid with a carbon number more than 12 will give esters having high viscosity and hence the resulting electric insulating oil is poor in cooling properties.

The above-mentioned $C_{8-20}$ higher fatty acid should preferably be one which is derived from vegetable oils such as coconut oil, palm kernel oil, soybean oil, and palm oil, which are renewable sources and hence are desirable from the stand point of reducing load on energy and environment. The high fatty acid may be either saturated ones or unsaturated ones, with the latter being more suitable.

Examples of the $C_{6-14}$ branched aliphatic monohydric alcohol include 2-ethylbutyl alcohol, 2-ethylpentyl alcohol, 2-ethylhexyl alcohol, 2-ethyloctyl alcohol, 2-ethyllauryl alcohol, 2-butylbutyl alcohol, 2-butyloctyal alcohol, 2-hexylhexyl alcohol, 2-hexylbctyl alcohol, 3-ethylhexyl alcohol, 3-ethyloctyl alcohol, 3-ethyllauryl alcohol, isodecyl alcohol, and isotridecyl alcohol. They may be used alone or in combination with one another.

The $C_{6-14}$ branched aliphatic monohydric alcohol should not be replaced by any of branched aliphatic monohydric alcohols with a carbon number no smaller than 15 or any of dihydric or polyhydric alcohols, because they will give an ester having excessively high viscosity and hence the resulting electric insulating oil is poor in cooling properties. In addition, aromatic alcohols (having a benzyl group or phenyl group) are undesirable from the standpoint of safety because they might be harmful to human bodies. Also, $C_{6-14}$ linear aliphatic monohydric alcohols give esters having a high pour point.

The ester of a $C_{8-20}$ higher fatty acid with a $C_{6-14}$ branched aliphatic monohydric alcohol is not specifically restricted so long as the fatty acid and the alcohol meet the above-mentioned requirements. Typical examples of the ester include isotridecyl caprylate, isotridecyl caprate, 2-ethylhexyl laurate, isotridecyl laurate, 2-ethylhexyl myristate, isotridecyl myristate, 2-ethylhexyl stearate, isotridecyl stearate, 2-ethylhexyl oleate, isotridecyl oleate, 2-ethylhexyl linoleate, isotridecyl linoleate, isotridecyl linolenate, and 2-ethylhexyl linolenate. They may be used in combination with one another to give electric insulating oil with good electric characteristics.

Those esters derived from saturated higher fatty acids without double bonds are desirable because the resulting electric insulating oil has good chemical stability (or good oxidation resistance and thermal resistance). Of the above-mentioned esters, the following are suitable. Isotridecyl caprylate, isotridecyl caprate, 2-ethylhexyl laurate, isotridecyl laurate, 2-ethylhexyl myristate, and isotridecyl myristate.

The above-mentioned ester may be produced by any one of various known methods listed below.

(1) Esterification of a $C_{8-20}$ higher fatty acid with a $C_{6-14}$ branched aliphatic monohydric alcohol in the presence of acid or alkali.

(2) Transesterification of a $C_{8-20}$ higher fatty acid ester with a $C_{6-14}$ branched aliphatic monohydric alcohol in the presence of acid or alkali.

(3) Transesterification of a vegetable oil (such as palm oil, soybean oil, coconut oil, and palm kernel oil) with a $C_{6-14}$ branched aliphatic monohydric alcohol in the presence of acid or alkali and subsequent fractional distillation.

The higher fatty acid (ester) used in these processes includes waste edible vegetable oil, waste fatty acid, and waste fatty acid ester.

The base material for electric insulating oil which is defined in the second aspect of the present invention is an ester of palm oil-derived mixed fatty acids and/or soybean oil-derived mixed fatty acids with a $C_{1-5}$ aliphatic monohydric alcohol or a $C_{6-14}$ branched aliphatic monohydric alcohol.

Palm oil and soybean oil are ranked above rapeseed oil, corn oil, and safflower oil as renewable vegetable oils in view of the quantities and districts of their worldwide production.

The term "palm oil-derived mixed fatty acids and/or soybean oil-derived mixed fatty acids" means a mixture of fatty acids constituting each fatty acid. To be concrete, palm oil is composed of lauric acid (trace), myristic acid (1 to 3 wt %), palmitic acid (40 to 50 wt %), stearic acid (2 to 5 wt %), oleic acid (35 to 45 wt %), linoleic acid (5 to 15 wt %), and others (remainder). Soybean oil is composed of palmitic acid (7 to 12 wt %), stearic acid (2 to 5.5 wt %), oleic acid (20 to 50 wt %), linoleic acid (35 to 60 wt %), linolenic acid (2 to 13 wt %), and others (remainder).

Incidentally, the palm oil-derived mixed fatty acids should preferably be those in which the major constituents are $C_{18}$ fatty acids. They may be prepared by removing excess palmitic acid from palm oil by distillation. Thus, they are composed of palmitic acid (less than 1 wt %), stearic acid (5 to 15 wt %), oleic acid (65 to 85 wt %), linoleic acid (7 to 20 wt %), and others (remainder).

Examples of the above-mentioned $C_{1-5}$ aliphatic monohydric alcohol include methanol, ethanol, n-propyl alcohol, i-propyl alcohol, n-butyl alcohol, i-butyl alcohol, tert-butyl alcohol, n-pentyl alcohol, i-pentyl alcohol, and tert-pentyl alcohol, and a mixture of two or more of them.

Also, the above-mentioned $C_{6-14}$ branched aliphatic monohydric alcohol may be the same one as used for the base material for electric insulating oil which is defined in the first aspect of the present invention.

Of the above-mentioned examples, $C_{1-5}$ aliphatic monohydric alcohols are suitable because they give the ester of palm oil-derived mixed fatty acids and/or soybean oil-derived mixed fatty acids which has a low viscosity (desirable for electric insulating oil to perform cooling) and good electrical properties.

Incidentally, those alcohols specified in the present invention should not be replaced by linear aliphatic alcohols with a carbon number of 6 or above, branched aliphatic monohydric alcohols with a carbon number of 15 or above, and dihydric or polyhydric alcohols. These substitutes will give esters having a high viscosity, which is undesirable for electric insulating oil to perform cooling.

The ester as the base material for electric insulating oil which is defined in the second aspect of the present invention may be produced by any one of various known methods listed below.

(1) Transesterification of palm oil and/or soybean oil with a $C_{1-15}$ aliphatic monohydric alcohol or $C_{6-14}$ branched aliphatic monohydric alcohol in the presence of acid or alkali.

(2) Esterification of palm oil-derived mixed fatty acids and/or soybean oil-derived mixed fatty acids, which are obtained by hydrolysis of palm oil or soybean oil, with a $C_{1-5}$ aliphatic monohydric alcohol or $C_{6-14}$ branched aliphatic monohydric alcohol in the presence of acid or alkali.

Incidentally, the former method may be modified such that the product obtained by transesterification of palm oil with an aliphatic monohydric alcohol is converted into a mixed fatty acid ester (with $C_{18}$ components dominating) by distillation to separate the fraction of palmitate ester.

The above-mentioned esters may also be obtained by esterification or transesterification of waste edible palm oil and/or soybean oil, waste mixed fatty acids, or waste mixed fatty acid esters with a $C_{1-5}$ aliphatic monohydric alcohol or $C_{6-14}$ branched aliphatic monohydric alcohol in the presence of acid or alkali.

Commercial products suitable for the present invention include:

Paster M182 (from Lion Corporation), which is a methyl ester of palm oil-derived mixed fatty acids, with methyl palmitate fractionally separated.

Toenol 3120 (from Toei Chemical Corporation), which is a methyl ester of soybean oil-derived mixed fatty acids.

Toenol 4120 (from Toei Chemical Corporation), which is an n-butyl ester of soybean oil-derived mixed fatty acids.

The above-mentioned ester for electric insulating oil according to the first and second aspects of the present invention should preferably be purified for improvement in electrical characteristics. Such purification may be accomplished by removal of alcohol, separation of glycerin, removal of inorganic components, neutralization, water washing, distillation, clay treatment, and degassing. Adsorption treatment with activated clay or activated alumina to reduce acid value and degassing to reduce water content are particularly desirable for esters with a high acid value and water content detrimental to electrical properties.

Adsorption treatment with activated clay or activated alumina is intended to remove free fatty acids and acid catalyst. It is accomplished by adding activated clay and/or activated alumina to the ester for adsorption of free fatty acids, and then removing activated clay and/or activated alumina by filtration.

This procedure should preferably be accomplished as follows by using an inorganic adsorbent composed mainly of Mg, Al, or Si, such as Kyoward 100, 200, 300, 400, 500, 600, 700, 1000, 2000, etc. (from Kyowa Chemical Industry Co., Ltd) and Tomita AD100, 500, 600, 700, etc. (from Tomita Pharmaceutical Co., Ltd). One hundred parts by weight of the ester is incorporated with 0.01 to 5 parts by weight of the adsorbent, and the resulting mixture is kept at 20 to 160° C. for 10 minutes to 10 hours under atmospheric pressure, reduced pressure, or inert gas atmosphere (argon or nitrogen). The procedure reduces the acid value of the ester below 0.0001 to 0.01 mgKOH/g, preferably 0.0001 to 0.005 mgKOH/g. The reduced acid value greatly improves the electric properties of the ester.

Degassing is intended to remove moisture and air from the ester. It is accomplished typically by distillation (that follows replacement with nitrogen) under reduced pressure (0.1 to 80 kPa) at 20 to 160° C. for 10 minutes to 10 hours. For efficient degassing, the ester may be mixed with an azeotropic agent (such as toluene, kerosene, isopropyl alcohol, ethanol, and pyridine) that forms an azeotrope with water. The amount of the azeotropic agent should be 0.1 to 3 mol for moisture in the ester. This step should reduce the content of moisture in the ester below 0.1 to 100 ppm, preferably 0.1 to 50 ppm.

After degassing, the ester should preferably be stored in an atmosphere of nitrogen or dry air so that it will not absorb moisture again. Alternatively, the ester may be incorporated with a dehydrating agent, such as "Molecular Sieves 4A" (from Junsei Chemical Co., Ltd), in an amount of 0.1 to 30 pbw for 100 pbw of the ester. The dehydrating agent will keep the moisture content below 0.1 to 50 ppm for a long period of time.

The above-mentioned ester may be used alone as electric insulating oil but it may also be used in combination with an antioxidant, pour point depressant, antistatic agent, etc.

It is desirable to use a pour point depressant to lower the pour point of the ester. Examples of the pour point depressant include alkyl methacrylate polymer and alkyl acrylate polymer. Linear or branched $C_{1-20}$ alkyl (meth)acrylate polymers having a weight-average molecular weight of 5000 to 500,000 are suitable.

The amount of the alkyl (meth)acrylate polymer is 0.01 to 5 pbw, preferably 0.01 to 3 pbw, for 100 pbw of the ester. With an amount less than 0.01 pbw, it will not produce the effect of improving fluidity at low temperatures. With an amount more than 5 pbw, it will make the ester viscous.

Typical examples of the alkyl (meth)acrylate polymer include polyheptyl acrylate, polyheptyl methacrylate, polynonyl acrylate, polynonyl methacrylate, polyundecyl acrylate, polyundecyl methacrylate, polytridecyl acrylate, polytridecyl methacrylate, polypentadecyl acrylate, polypentadecyl methacrylate, polyheptadecyl acrylate, polyheptadecyl methacrylate, polymethyl acrylate, polymethyl methacrylate, polypropyl acrylate, and polypropyl methacrylate. "Acrube 100" series (132, 133, 136, 137, 138, 146, and 160) from Sanyo Chemical Industries, Ltd. are among the commercial products which excel in the pour point depressing effect and the handling properties.

The base material for electric insulating oil according to the present invention may be formed from any other materials than mentioned above. That is, the alcohol constituting the ester may be replaced by its alkylene oxide adduct. The alkylene oxide adduct of alcohol gives an ester with a reduced pour point. Incidentally, the base material for electric insulating oil according to the present invention may also be prepared by mixing the above-mentioned ester with a derivative of fatty acid ester containing alkylene oxide added thereto.

The alkylene oxide adduct of alcohol is exemplified by those which are obtained by adding ethylene oxide or propylene oxide or a mixture thereof (1 to 5 mol, preferably 1 to 3 mol) to alcohol.

To be concrete, the alkylene oxide adduct of alcohol is obtained by introducing an alkylene oxide into an ester with the help of a catalyst composed mainly of metal oxide (such as aluminum and magnesium) or by esterification or ester exchange of a fatty acid or a fatty acid ester with an alkylene oxide adduct of alcohol.

The base material for electric insulating oil according to the first and second aspects of the present invention may be used in combination with conventional electric insulating oils (listed below) because of its good compatibility.

Alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenylbutene-1, 1,4-diphenyl-4-methyl-pentene-1, silicone oil, mineral oil, and vegetable oil.

Of these conventional electric insulating oils, vegetable oil and silicone oil are suitable from the standpoint of safety and low load on energy and environment. Mineral oils are also suitable because of their ability to reduce viscosity and lower pour point.

The base material for electric insulating oil according to the present invention may be mixed with conventional electric insulating oils in any ratio because of its good compatibility. However, it is desirable to mix 100 pbw of the former with less than 300 pbw of the latter in consideration of reducing load on environment.

EXAMPLES

In the following, the invention will be described in more detail with reference to Examples and Comparative Examples, which are not intended to restrict the scope thereof.

In Examples and Comparative Examples, the following methods were used to measure acid value, water content, kinematic viscosity, pour point, and flash point. The test for oxidation stability was carried out according to the method mentioned in (6) below.

(1) Acid value: JIS K1557, by measurement of potential difference.

(2) Water content: JIS K0068, conforming to Karl Fischer method.

(3) Kinematic viscosity: JIS K2283.

(4) Pour point: JIS K2269.

(5) Flash point: JIS K2265, conforming to Cleveland open cup method.

(6) Oxidation stability: JIS C2101, according to the test method for electric insulating oil.

Example 1

2-ethylhexyl laurate was prepared by esterification reaction between lauric acid and 2-ethylhexanol in the presence of p-toluenesulfonic acid as a catalyst, and subsequent steps for recovery of unreacted 2-ethylhexanol, neutralization, washing with hot water, and dehydration.

The resulting ester (100 pbw) was incorporated with 2.5 pbw of inorganic synthetic adsorbent ("Kyoward 500SH" from Kyowa Chemical Industry Co., Ltd). Adsorption was performed at 110° C. for 2 hours under a reduced pressure of 2.7 kPa. The adsorbent was removed by filtration.

The resulting product, which was designated as the base material (A) for electric insulating oil, was found to have an acid value of 0.002 mgKOH/g, a water content of 44 ppm, a kinematic viscosity of 4.9 $mm^2/s$, and a pour point of −45° C. It kept a low water content of 6 ppm for 1 month during its storage under a nitrogen atmosphere in the presence of molecular sieves 4A (from Junsei Chemical Co., Ltd) that prevents water absorption.

Example 2

A methyl ester of palm oil-derived mixed fatty acids was prepared by esterification reaction between palm oil and methanol in the presence of sodium hydroxide and subsequent steps for removal of glycerin and removal of methyl palmitate by multi-stage distillation. The thus obtained ester is composed mainly of $C_{18}$ fractions (stearic acid, oleic acid, and linoleic acid). It was found to have an acid value of 0.18 mgKOH/g, a water content of 120 ppm, a kinematic viscosity of 4.6 $mm^2/s$, and a pour point of 7.5° C. It is commercially available under a trade name of Paster M182, from Lion Corporation.

This product (Paster M182) underwent ester exchange with 2-ethylhexanol to give a 2-ethylhexyl ester of palm oil-derived mixed fatty acids, which has an acid value of 0.016 mgKOH/g, a water content of 100 ppm, a kinematic viscosity of 8.0 $mm^2/s$, and a pour point of −20° C.

The resulting ester was treated in the same way as in Example 1 to reduce acid value and water content. The resulting product, which was designated as the base material (B) for electric insulating oil, was found to have an acid value of 0.001 mgKOH/g, a water content of 9 ppm, a kinematic viscosity of 8.0 $mm^2/s$, and a pour point of −20° C. It kept a low water content of 9 ppm for 1 month during its storage under a nitrogen atmosphere in the presence of molecular sieves 4A (from Junsei Chemical Co., Ltd) that prevents water absorption.

Example 3

The base material (B) for electric insulting oil, which was obtained in Example 2, was incorporated with a pour point depressant (Acrube 138 from Sanyo Chemical Industries, Ltd.). The mixing ratio was 100 pbw (for the former) to 1.5 pbw (for the latter). The resulting product was designated as the base material (C) for electric insulating oil. It was found to have a kinematic viscosity of 8.3 $mm^2/s$ and a pour point of −35° C.

Example 4

A product designated as the base material (D) for electric insulating oil was prepared by incorporating 100 pbw of methyl ester of soybean oil-derived mixed fatty acids with 1.0 pbw of pour point depressant (Acrube 132 from Sanyo Chemical Industries, Ltd.). The methyl ester is commercially available under a trade name of "Toenol 3120" (from Toei Chemical). It has an acid value of 0.15 mgKOH/g, a water content of 339 ppm, a kinematic viscosity of 4.6 $mm^2/s$, and a pour point of −5° C. The same procedure as in Example 1 was carried out to reduce acid value and water content. The resulting product was found to have an acid value of 0.0029 mgKOH/g, a water content of 27 ppm, a kinematic viscosity of 5.0 $mm^2/s$, and a pour point of −25° C.

Example 5

Ester exchange was performed on Paster M182 (which was obtained in Example 2) and isotridecyl alcohol (Exxal 13, from Exxon Chemical) to give an isotridecyl ester of palm oil-derived mixed fatty acids (which has an acid value of 0.04 mgKOH/g, a water content of 100 ppm, a kinematic viscosity of 14.0 $mm^2/s$, and a pour point of −20° C.). The same procedure as in Example 1 was carried out to reduce acid value and water content. The resulting product, which was designated as the base material (E) for electric insulating oil, was found to have an acid value of 0.002 mgKOH/g, a water content of 40 ppm, a kinematic viscosity of 14.0 $mm^2/s$, and a pour point of −20° C.). It kept a low water content of 6 ppm for 1 month during its storage under a nitrogen atmosphere in the presence of molecular sieves 4A (from Junsei Chemical Co., Ltd) that prevents water absorption.

Example 6

Ester exchange was performed on methyl laurate (Paster M12, from Lion Corporation) and isododecyl alcohol (Exxal 13, from Exxon Chemical) to give an isotridecyl laurate (which has an acid value of 0.02 mgKOH/g, a water content of 100 ppm, a kinematic viscosity of 9.4 $mm^2/s$, and a pour point of −40° C.). The same procedure as in Example 1 was carried out to reduce acid value and water content. The resulting product, which was designated as the base material (F) for electric insulating oil, was found to have an acid value of 0.003 mgKOH/g, a water content of 72 ppm, a kinematic viscosity of 9.4 $mm^2/s$ and a pour point of −40° C.). It kept a low water content of 7 ppm for 1 month during its storage under a nitrogen atmosphere in the presence of molecular sieves 4A (from Junsei Chemical Co., Ltd) that prevents water absorption.

Example 7

Ester exchange was performed on methyl caprate (Paster M8, from Lion Corporation) and isododecyl alcohol (Exxal 13, from Exxon Chemical) to give an isotridecyl caprate (which has an acid value of 0.03 mgKOH/g, a water content of 100 ppm, a kinematic viscosity of 5.9 $mm^2/s$, and a pour point lower than −50° C.). The same procedure as in Example 1 was carried out to reduce acid value and water content. The resulting product, which was designated as the base material (G) for electric insulating oil, was found to have an acid value of 0.005 mgKOH/g, a water content of 57 ppm, a kinematic viscosity of 5.9 $mm^2/s$, and a pour point lower than −50° C.). It kept a low water content of 4 ppm for 1 month during its storage under a nitrogen atmosphere in the presence of molecular sieves 4A (from Junsei Chemical Co., Ltd) that prevents water absorption.

Comparative Examples 1 to 4

Usefulness as base materials for electric insulating was tested for corn oil, mineral oil, methyl laurate (Paster M12, from Lion Corporation), and ester of rapeseed oil with n-octyl alcohol in Comparative Examples 1 to 4, respectively.

Comparative Examples 5 to 9

Usefulness as base materials for electric insulating was tested for methyl myristate having a freezing point of 18.5° C. (Paster M14, from Lion Corporation), methyl palmitate having a freezing point of 31° C. (Paster M16, from Lion Corporation), butyl palmitate having a freezing point of 20° C. (Paster B-16, from Lion Corporation), methyl stearate having freezing point of 40° C. (Paster M180, from Lion Corporation), and butyl stearate having a freezing point of 23° C. (Paster B-18, from Lion Corporation) in Comparative Examples 5 to 9, respectively. They were inadequate as base materials for electric insulating oil because they remain solid at normal temperature on account of their high melting point.

The samples obtained in Examples 1 to 7 and Comparative Examples 1 to 4 are characterized by raw material oil, constituent fatty acid, constituent alcohol, kinematic viscosity, pour point, flash point, acid value, and water content as shown in Table 1.

TABLE 1

| | | Raw material oil | Fatty acid (wt %) | Monohydric alcohol | Pour point depressant | Kinematic viscosity at 40° C. ($mm^2/s$) | Pour point (° C.) | Flash point (° C.) | Acid value (mgKOH/g) | Water content (ppm) |
|---|---|---|---|---|---|---|---|---|---|---|
| Example | 1 | — | Lauric acid: 99 | 2-ethylhexanol | — | 4.9 | −45 | 176 | 0.002 | 6 |
| | 2 | Palm oil | Palmitic acid: 0.2<br>Stearic acid: 9<br>Oleic acid: 72<br>Linoleic acid: 18 | 2-ethylhexanol | — | 8.0 | −20 | 224 | 0.001 | 9 |
| | 3 | Palm oil | Same as Example 2 | 2-ethylhexanol | Acrube 138 | 8.3 | −35 | 224 | 0.001 | 9 |
| | 4 | Soybean oil | Palmitic acid: 7<br>Stearic acid: 3<br>Oleic acid: 42<br>Linoleic acid: 41<br>Linolenic acid: 6 | Methanol | Acrube 132 | 5.0 | −25 | 188 | 0.0029 | 27 |
| | 5 | Palm oil | Same as Example 2 | Isotridecyl alcohol | — | 14.0 | −20 | 230 | 0.002 | 6 |
| | 6 | — | Lauric acid: 99 | Isotridecyl alcohol | — | 9.4 | −40 | 204 | 0.003 | 7 |
| | 7 | — | Caprylic acid: 99 | Isotridecyl Alcohol | — | 5.9 | ≦−50 | 182 | 0.005 | 4 |
| Comparative Example | 1 | Corn oil | Palmitic acid: 13<br>Stearic acid: 2<br>Oleic acid: 35<br>Linoleic acid: 49<br>Linolenic acid: 1 | — | — | 32.8 | −15 | 320 | 0.116 | 8 |
| | 2 | — | — | — | — | 8.5 | −35 | 158 | <0.01 | 8 |
| | 3 | — | Lauric acid: 99 | Methanol | — | 2.4 | 5 | 125 | 0.04 | 8 |
| | 4 | Rapeseed oil | Palmitic acid: ca. 5<br>Stearic acid: ca. 5<br>Oleic acid: 58<br>Linoleic acid: 22<br>Linolenic acid: 11 | n-octyl alcohol | — | 8.0 | −5 | — | 0.55 | 7 |

The base materials for electric insulating oil which were obtained in Examples 1 to 7 and Comparative Examples 1 to 4 were tested for breakdown voltage, permittivity, volume resistivity, and dielectric loss tangent (which are electrical properties required of electric insulating oil). The results are shown in Table 2. This test was carried out according to JIS C2101.

TABLE 2

| | Base material for electric insulating oil | Break-Down voltage (kV/2.5 mm) | Permittivity at 80° C. | Volume resistivity at 80° C. (Ωcm) | Dielectric loss tangent at 80° C. (%) |
|---|---|---|---|---|---|
| Example 1 | A | 78 | 2.66 | $1.7 \times 10^{13}$ | 0.45 |
| Example 2 | B | 83 | 2.84 | $3.3 \times 10^{13}$ | 0.22 |
| Example 3 | C | 83 | 2.84 | $2.1 \times 10^{13}$ | 0.22 |
| Example 4 | D | 88 | 3.00 | $6.2 \times 10^{12}$ | 0.31 |
| Example 5 | E | 75 | 2.70 | $6.8 \times 10^{13}$ | 0.10 |

TABLE 2-continued

| | Base material for electric insulating oil | Break-Down voltage (kV/2.5 mm) | Permittivity at 80° C. | Volume resistivity at 80° C. (Ωcm) | Dielectric loss tangent at 80° C. (%) |
|---|---|---|---|---|---|
| Example 6 | F | 66 | 2.78 | $5.5 \times 10^{13}$ | 0.14 |
| Example 7 | G | 76 | 2.90 | $1.2 \times 10^{13}$ | 0.33 |
| Comparative Example 1 | Corn oil | — | 2.89 | $1.5 \times 10^{12}$ | 1.16 |
| Comparative Example 2 | Mineral oil | 75 | 2.15 | $4.5 \times 10^{15}$ | 0.003 |
| Comparative Example 3 | Methyl laurate | 84 | 3.17 | $3.1 \times 10^{11}$ | 10.3 |
| Comparative Example 4 | Ester of rapeseed oil with n-octyl alcohol | — | 2.79 | $1.6 \times 10^{12}$ | 0.30 |

It is noted from Tables 1 and 2 that the base materials (A to G) for electric insulating oil, which were obtained in Examples 1 to 7, excel those which were obtained in Comparative Examples 1 to 4 as indicated by the low pour point, the low viscosity, and the high flash point (which ensures safety). They also possess good electrical properties for practical use.

Example 8 to 12 and Comparative Example 10 and 11

The base materials for electric insulating oil which are shown in Table 3 were tested for initial acid number and total acid number (mgKOH/g). The test for total acid number was performed on the sample which had been allowed to stand at 120° C. for 75 hours after the test for oxidation stability conforming to JIS C2101 (specifying test methods for electric insulating oil). The results are also shown in Table 3.

TABLE 3

| | Base material for electric insulating oil | Initial acid number (mgKOH/g) | Total acid number measured after oxidation stability test (mgKOH/g) |
|---|---|---|---|
| Example 8 | A | 0.002 | 0.3 |
| Example 9 | B | 0.001 | 0.5 |
| Example 10 | F | 0.003 | 0.3 |
| Example 11 | G | 0.005 | 0.3 |
| Example 12 | Paster M182 plus Acrube 132 *[1] | 0.18 | 0.8 |
| Comparative Example 10 | Ester of rapeseed oil with isobutyl alcohol *[2] | 0.005 | 1.1 |
| Comparative Example 11 | Mineral oil | <0.01 | 0.2 |

*[1] Mixing ratio = 100 pbw of Paster M182 to 1.0 pbw of Acrube 132.
*[2] Rapeseed oil has the same fatty acid composition as that in Comparative Example 4.

It is noted from Table 3 that the base materials (A, F, and G) for electric insulating oil in Examples 8, 10, and 11 are comparable to mineral oil in oxidation stability even though they are esters of saturated fatty acids. It is also noted from Table 3 that the base materials for electric insulating oil in Examples 9 and 12 are superior in oxidation stability to the ester of rapeseed oil-derived fatty acid in Comparative Example 10 even though they are esters of palm oil-derived fatty acids.

The invention claimed is:

1. A base material comprising an ester of a $C_{8-20}$ higher fatty acid with a $C_{6-14}$ branched aliphatic monohydric alcohol, wherein the fatty acid is selected form the group consisting of caprylic acid, capric acid, lauric acid, myristic acid and combination thereof, wherein the base material is used for electric insulating oil.

2. A base material comprising an ester of palm oil-derived mixed fatty acid with an $C_{1-5}$ aliphatic monohydric alcohol or a $C_{6-14}$ branched aliphatic monohydric alcohol, wherein the base material is used for electric insulating oil.

3. The base material for electric insulating oil as defined in claim 1 or 2, which further comprises a pour point depressant.

4. The base material for electric insulating oil as defined in claim 1, wherein the ester is isotridecyl caprylate, isotridecyl caprate, 2-ethylhexyl laurate, isotridecyl laurate, 2-ethylhexyl myristate, isotridecyl myristate, or combinations thereof.

5. An electric insulating oil for insulating or cooling transformers, cables, circuit breakers and capacitors, comprising the base material as defined in claim 1.

6. An electric insulating oil for insulating or cooling transformers, cables, circuit breakers and capacitors, comprising the base material as defined in claim 2.

7. The base material for electric insulating oil as defined in claim 2, wherein the palm oil-derived mixed fatty acids comprises $C_{18}$ fatty acids as a major constituent.

8. The base material for electric insulating oil as defined in claim 1 or 2, wherein the monohydric alcohol does not include linear aliphatic alcohols with $C_6$ or more, branched aliphatic monohydric alcohols with $C_{15}$ or more, or dihydric or polyhydric alcohols.

9. The base material for electric insulating oil as defined in claim 1 or 2, wherein the ester is a purified ester.

10. The base material for electric insulating oil as defined in claim 3, wherein the pour point depressant includes alkyl methacrylate polymer or alkylacrylate polymer.

11. The base material for electric insulating oil as defined in claim 10, wherein the pour point depressant is used in an amount of 0.01 pbw to 5 pbw based on 100 pbw of the ester.

12. An electric insulating oil comprising:

the base material for electric insulating oil as defined in claim 1 or 2; and at least one electric insulating oil selected from the group consisting of alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenyl-butene-1, 1,4-diphenyl-4-methyl-pentene-1, silicone oil, mineral oil, and vegetable oil.

13. The electric insulating oil as defined in claim 12, wherein 100 pbw of the base material for electric insulating oil is mixed with less than 300 pbw of the at least one electric insulating oil.

14. An electric insulating oil, consisting essentially of:

a purified ester of $C_{8-20}$ higher fatty acid with $C_{6-14}$ branched aliphatic monohydric alcohol, wherein the fatty acid is selected from the group consisting of caprylic acid, capric acid, lauric acid, myristic acid and combinations thereof having an acid value of 0.0001 to 0.01 mgKOH/g;

at least one of antioxidant, pour point depressant, and antistatic agent; and optionally, at least one electric insulating oil selected from the group consisting of alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenylbutene-1, 1,4-diphenyl-4-methyl-pentene-1, silicone oil, mineral oil, and vegetable oil.

15. An electric insulating oil, consisting essentially of:

a purified ester of palm oil-derived mixed fatty acids with $C_{1-5}$ aliphatic monohydric alcohol or $C_{6-14}$ branched aliphatic monohydric alcohol, wherein the palm oil-derived mixed fatty acids comprises less than 1 wt % of palmitic acid, 5 to 15 wt % of stearic acid, 65 to 85 wt % of oleic acid, 7 to 20 wt % of linoleic acid having an acid value of 0.0001 to 0.01 mgKOH/g;

at least one of antioxidant, pour point depressant, and antistatic agent; and optionally, at least one electric insulating oil selected from the group consisting of alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenylbutene-1, 1,4-diphenyl-4-methyl-pentene-1, silicone oil, mineral oil, and vegetable oil.

16. The electric insulating oil as defined in claim 14, wherein 100 pbw of the base material for electric insulating oil is mixed with less than 300 pbw of the at least one electric insulating oil.

17. The electric insulating oil as defined in claim 15, wherein 100 pbw of the base material for electric insulating oil is mixed with less than 300 pbw of the at least one electric insulating oil.

18. The electric insulating oil as defined in claim 14, consisting of:

a purified ester of $C_{8-20}$ higher fatty acid with $C_{6-14}$ branched aliphatic monohydric alcohol, wherein the fatty acid is selected from the group consisting of caprylic acid, capric acid, lauric acid, myristic acid and combinations thereof having an acid value of 0.0001 to 0.005 mgKOH/g;

at least one of antioxidant, pour point depressant, and antistatic agent; and optionally, at least one electric insulating oil selected from the group consisting of alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenylbutene-1, 1,4-diphenyl-4-methyl-pentene-1, silicone oil, mineral oil, and vegetable oil.

19. The electric insulating oil as defined in claim 15, consisting of:

a purified ester of $C_{8-20}$ higher fatty acid with $C_{6-14}$ branched aliphatic monohydric alcohol, wherein the fatty acid is selected from the group consisting of caprylic acid, capric acid, lauric acid, myristic acid and combinations thereof having an acid value of 0.0001 to 0.005 mgKOH/g;

at least one of antioxidant, pour point depressant, and antistatic agent; and optionally, at least one electric insulating oil selected from the group consisting of alkylbenzene, alkylindan, polybutene, poly-α-olefin, phthalic ester, diaryl alkane, alkyl naphthalene, alkyl biphenyl, triaryl alkane, terphenyl, aryl naphthalene, 1,1-diphenyl ethylene, 1,3-diphenylbutene-1, 1,4-diphenyl-4-methyl-pentene-1, silicone oil, mineral oil, and vegetable oil.

* * * * *